May 26, 1959 D. GLEGG 2,888,034
ONE-PIECE DOUBLE CHECK VALVE
Filed Aug. 2, 1956
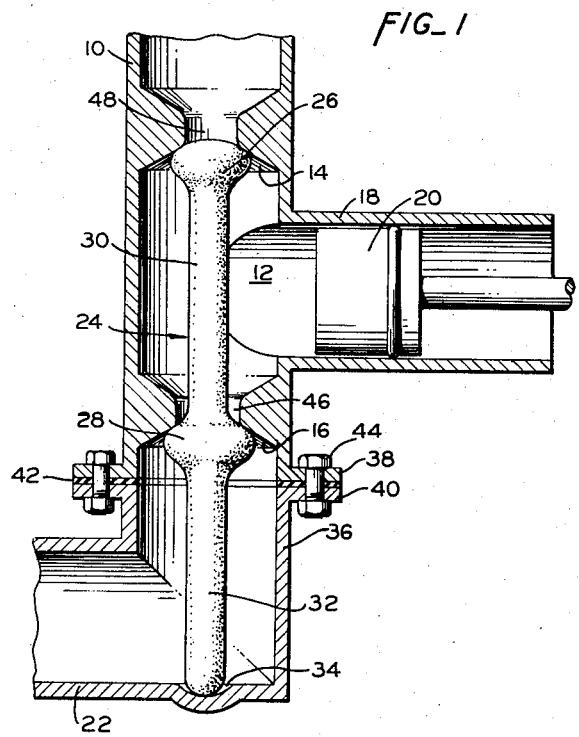
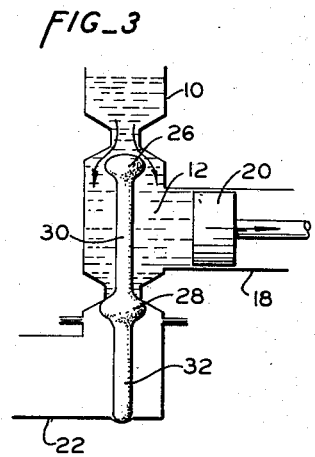
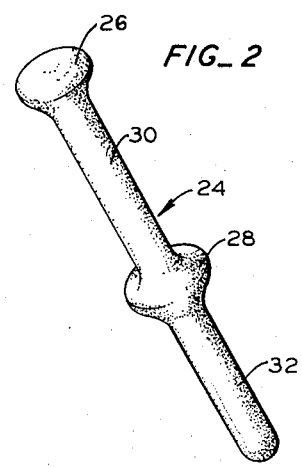
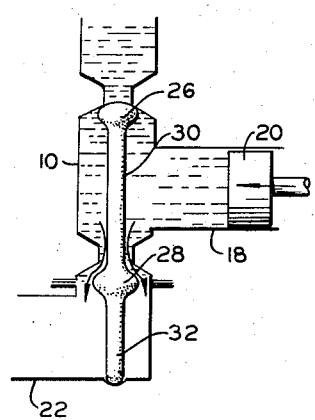
INVENTOR.
DOUGLAS CLEGG
BY
ATTORNEYS 2,888,034

ONE-PIECE DOUBLE CHECK VALVE

Douglas Glegg, Kellogg, Calif.

Application August 2, 1956, Serial No. 601,704

5 Claims. (Cl. 137—512.4)

This invention relates to the valve art, and more particularly to a one-piece double check valve associated with each of two valve seat ends of a chamber and adapted in response to low and high pressure conditions within the chamber to control the flow of fluid into and out of the chamber.

An object of the invention is to provide a one-piece valve element adapted to replace two separate check valves of such as the spring-urged ball type.

A further object of the invention is to provide means in association with said one-piece double check valve element whereby said element may be quickly and simply removed from the valve housing for checking and inspection of the valve element and the valve seats.

Other objects and advantages of the invention will be apparent from the following description taken in conjunction with the drawing forming part of this specification, and in which:

Figure 1 is a view in vertical longitudinal section of a valve seat containing conduit, with the subject valve element being shown in side elevation;

Figure 2 is a view in perspective of the subject valve element;

Figure 3 is a semi-schematic view illustrating the manner in which the valve element operates in response to a low pressure condition within the valve chamber; and Figure 4 is a semi-schematic view showing the manner in which the valve element operates in response to a high pressure condition with the valve chamber.

While I do not wish to limit the field of use of the valve element, I have, in practice, utilized this valve element as a component of an automatic milking system for cows. Milk is drawn from the cow through the usual suction line into a vacuum releaser with which the conduit 10 of Figure 1 is in communication. The automatic milking system referred to is the subject matter of my co-pending application Serial Number 550,917, filed December 5, 1955. In the said milking system, milk is drawn from the vacuum releaser through conduit 10 into the chamber 12, defined between upper and lower valve seats 14 and 16 by conduit 10 and communicating conduit 18, by the suction action of a pump, here represented by the plunger 20, and is pumped from chamber 12 into milk transport line 22 during the pressure stroke of the pump. The one-piece valve element indicated generally at 24 coacts with both of the valve seats 14 and 16 and thereby takes the place of two separate and conventional check valves.

One-piece valve element 24 is formed of rubber having a relatively high density. It is, however, sufficiently resilient to be longitudinally stretched and compressed to the degree necessary to enable it to operate in the manner hereinafter described. It is provided with a first enlarged upper valve seat engaging portion 26 adapted to seal off valve seat 14 and with a second enlarged lower valve seat engaging portion 28 adapted to seal off valve seat 16. Valve seat engaging portions 26 and 28 are joined by a first stem portion 30. The valve element is further comprised of a second stem portion 32 which engages within a recess 34 formed in conduit 22 and thereby positions the valve seat engaging portions 26 and 28 for cooperation with their respective valve seats.

When the pump, or plunger, 20 moves to the right, as indicated in Figure 3, a low pressure, or suction, condition is set up in chamber 12. The imbalance between the lower pressure condition in chamber 12 and the higher pressure condition above valve seat 14 and below valve seat 16 causes valve seat engaging portion 26 to move away from valve seat 14 and causes valve seat engaging portion 28 to be pushed tightly against valve seat 16. Downward movement of valve seat engaging portion 26 relative to valve seat engaging portion 28 is enabled by longitudinal compression of stem portion 30. Chamber 12 thereby becomes filled with liquid.

During the pressure stroke of pump 20, as indicated in Figure 4, the imbalance between the higher pressure condition in chamber 12 and the lower pressure condition above valve seat 14 and below valve seat 16 causes valve seat engaging portion 26 to be tightly pressed against valve seat 14 and valve seat engaging portion 28 to be moved away from valve seat 16, thereby allowing the fluid in chamber 12 to be pumped from the chamber into conduit 22. When valve seat engaging portion 28 moves away from valve seat 16, stem portion 30 becomes longitudinally distended and stem portion 32 is longitudinally compressed. When the pump reaches the end of its pressure stroke, valve seat engaging portion 28 moves against valve seat 16.

Means are provided to enable ready and simple removal of the valve element 24 from the line for checking or replacement, or for visual inspection of the valve seats, such means comprising a disconnectible connection between conduit 10 and elbow portion 36 of conduit 22 constituted by flanges 38 and 30, gasket 42, and bolts 44. Conduit 22 is disconnected from conduit 10 and moved away therefrom; valve element 24 drops downwardly until valve seat engaging portion 26 engages the upper side of the annulus defining the flow passageway 46. Valve seat engaging portion 26 is slightly larger in diameter than flow passageway 46, but when the valve element is pulled downwardly portion 26 becomes sufficiently compressed to enable it to pass through flow passageway 46. Valve seat engaging portion 26 may be pressed upwardly through passageway 46 to enable the valve element 24 to be put back into place.

It is to be noted that upper flow passageway 48 is smaller in size than flow passageway 46. Therefore, while valve seat engaging portion 26 may be forced through passageway 46 to enable the removal of the valve element from the line, it cannot be forced upwardly through flow passageway 48 under the action of the pressure condition within chamber 12. Valve seat engaging portion 28 is sufficiently oversized in relation to flow passageway 46 to prevent it from being pushed through this passageway during the suction stroke of the pump.

What is claimed is:

1. A valve element comprising spaced enlarged first and second valve seat engaging portions having integral therewith and disposed therebetween a first stem portion, and a second stem portion integral with said second valve seat engaging portion and extending therefrom in a direction opposite that of said first stem portion, said first and second stem portions being formed of rubber of a type enabling them to be longitudinally stretched and shortened to a substantial degree.

2. A valve device comprising, in combination, a valve element having spaced enlarged first and second valve seat engaging portions, a first stem portion disposed between said seat engaging portions and interconnecting the same, a second stem portion connected with said second valve seat engaging portion and extending therefrom in a direction opposite that of said first stem portion, said first and second stem portions being formed of a resiliently deformable material enabling them to be longitudinally stretched and shortened, conduit means including means defining first and second spaced apart valve seats having associated therewith first and second flow passageways, and means disposed in longitudinally pressing relation with said second stem portion adapted to normally maintain said first and second valve seat engaging portions in engagement, respectively, with corresponding sides of said first and second valve seats.

3. A valve device comprising, in combination, a valve element having spaced enlarged first and second valve seat engaging portions, a first stem portion disposed therebetween and interconnecting the same, a second stem portion connected with said second valve seat engaging portion and extending therefrom in a direction opposite that of said first stem portion, said first and second stem portions being formed of a resiliently deformable material enabling them to be longitudinally stretched and shortened, conduit means including means defining first and second spaced apart valve seats having associated therewith first and second flow passageways, and means disposed in longitudinally pressing relation with said second stem portion adapted to normally maintain said first and second valve seat engaging portions in engagement, respectively, with corresponding sides of said first and second valve seats, said valve seat engaging portions being likewise formed of resiliently deformable material and being substantially diametrally over-sized in relation to said flow passageways associated therewith to prevent said valve seat engaging portions being forced through their associated flow passageways under the influence of operational pressure conditions, said first valve seat engaging portion being of lesser diameter than said second valve seat engaging portion and said second flow passageway being of larger diameter than said first flow passageway, whereby said first valve seat engaging portion may be passed through said second flow passageway, and said means in pressing relation with said second stem portion being removably associated therewith to enable said valve element to be removed from said conduit means.

4. An article of manufacture comprising a unitary generally cylindrical elongated member having a pair of spaced apart annular bulbous portions integral therewith, one of said portions being located at one end of said member and the other of said portions being located inwardly from the other end of said member, said member being homogeneously formed of a resiliently deformable material adapting it to be at least limitedly longitudinally stretched and shortened.

5. A valve element comprising spaced apart enlarged first and second valve seat engaging portions, a stem portion interconnecting said seat engaging portions, and a support portion connected to and extending from one of said seat engaging portions adapted to engage a support member for said valve element, said stem and support portions being formed of rubber of a type enabling them to be longitudinally stretched and shortened to a substantial degree.

References Cited in the file of this patent

UNITED STATES PATENTS

| | | |
|---|---|---|
| 1,860,888 | Crowley | May 31, 1932 |
| 2,101,316 | Kettnich | Dec. 7, 1937 |
| 2,106,638 | Hillier | Jan. 25, 1938 |
| 2,295,774 | Corydon et al. | Sept. 15, 1942 |
| 2,782,610 | Martin | Feb. 26, 1957 |

UNITED STATES PATENT OFFICE

CERTIFICATE OF CORRECTION

Patent No. 2,888,034                                                           May 26, 1959

Douglas Clegg

It is hereby certified that error appears in the above numbered patent requiring correction and that the said Letters Patent should read as corrected below.

In the grant, lines 1 and 12, and in the heading to the printed specification, line 3, name of inventor, for "Douglas Glegg," each occurrence, read -- Douglas Clegg, --; in the heading to the drawings, line 1, for "D. Glegg" read -- D. Clegg --.

Signed and sealed this 20th day of October 1959.

(SEAL)
Attest:

KARL H. AXLINE                                                        ROBERT C. WATSON
Attesting Officer                                             Commissioner of Patents